Patented Nov. 10, 1925.

1,561,130

UNITED STATES PATENT OFFICE.

HERMANN WIELAND, OF KONIGSBERG, GERMANY, ASSIGNOR TO THE FIRM C. H. BOEHRINGER SOHN, CHEMISCHE FABRIK, OF NIEDER-INGELHEIM-ON-THE-RHINE, GERMANY, A SOCIETY OF GERMANY.

ANÆSTHETIC.

No Drawing. Original application filed March 22, 1923, Serial No. 626,974. Divided and this application filed January 27, 1925. Serial No. 5,125.

*To all whom it may concern:*

Be it known that I, HERMANN WIELAND, a citizen of Germany, residing at Konigsberg, Prussia, Germany, have invented certain new and useful Improvements in Anæsthetics, of which the following is a specification.

My invention relates to improvements in the production of acetylene gas suitable for anæsthetic purposes.

My invention refers more especially to improvements of the narcotic qualities of the acetylene and mixtures containing other gases or vapours beside acetylene through addition of suitable fragrants to the substances mentioned.

Furthermore my invention relates to a new manner of anæsthetic means consisting of acetylene in mixture with fragrants or gaseous mixtures containing other gases or vapours beside acetylene and fragrants.

In my application No. 626,974 filed March 22, 1923, of which this application is a division, I have described a process for the production of unpoisonous acetylene which is adapted as anæstheticum for medical use, consisting in completely eliminating the impurities from raw acetylene, preferably the phosphoric compounds, by treating with suitable means, for instance chromic acid mass. The purification will be continued in freeing the acetylene entirely from the poisonous parts, until it becomes irresponsive to physiological toxic tests. The completely purified gas will be mixed with air or oxygen gas for anæsthetic purposes, whereby the acetylene employed may be charged with other narcotics, for instance the vapours of ether, chloroform, nitrous oxide or equivalent means. In the above-mentioned specification is mentioned, for instance, a mixture of about 40–50% acetylene, approximately 60 to 50% oxygen and from 5 to 10 drops of ether corresponding to about 1.5% of ether vapor, as a suitable anæsthetic mixture.

In the practical use of acetylene or of the mixture of acetylene with other gases and vapours, as described in my application No. 626,974, I have ascertained that the new narcotic means does not act upon all persons in the same way. Particularly I have observed cases in which a certain reflectory resistance is opposed on the side of the patients to the inhalation of the anæsthetic which considerably interferes with the administration thereof, particularly in the early stages.

Now I have found that this disadvantage of the acetylene may be entirely avoided by adding to the acetylene or to the mixture containing acetylene and other substances suitable quantities of more or less odorous substances or fragrants. The favorable action of this addition is probably due to a diversion of the nervous system which eliminates the reflectory resistance of the patient so that the narcotic agent is readily taken by the patient in the initial stages of inhalations.

As fragrants for the purpose mentioned may be preferably used cyclic alcohols such as for instance geraniol, linalool and their esters, citral or a mixture of these and equivalent substances.

Also the addition of the natural flavors and odorous substances obtained from flowers and containing these and similar odorous principles may be used with equal advantage.

The addition of the fragrant principle may be effected, for instance, by dissolving a suitable quantity thereof, to the amount of, say 3 to 5 for instance, in a solvent for acetylene, for example in acetone.

My invention is susceptible of various modifications and alterations, without deviating from the principle thereof, in order to better adapt it to varying conditions of application and to the disposition of the patient and to the convenience of the practitioner, and without limiting the invention to the particular languages and terms employed in the specification and claims for the purposes of explanation of the principles thereof.

Claims:

1. A composition of matter suitable for use as an anæsthetic, containing in major proportions acetylene irresponsive to physiological toxic tests, and a fragrant agent.

2. A composition of matter suitable for use as an anæsthetic, containing in major proportion acetylene irresponsive to physiological toxic tests, and a cyclic fragrant alcohol.

In testimony whereof I affix my signature.

HERMANN WIELAND.